(12) United States Patent
Lee et al.

(10) Patent No.: US 11,876,468 B2
(45) Date of Patent: Jan. 16, 2024

(54) MOTOR DRIVING APPARATUS

(71) Applicants: Hyundai Motor Company, Seoul (KR); Kia Corporation, Seoul (KR)

(72) Inventors: Yong Jae Lee, Yongin-si (KR); Joo Young Park, Yongin-si (KR); Young Kwan Ko, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 94 days.

(21) Appl. No.: 17/840,776

(22) Filed: Jun. 15, 2022

(65) Prior Publication Data
US 2023/0023016 A1 Jan. 26, 2023

(30) Foreign Application Priority Data

Jul. 20, 2021 (KR) .......................... 10-2021-0095067

(51) Int. Cl.
*H02P 27/08* (2006.01)
*H02K 3/28* (2006.01)
*H02K 11/33* (2016.01)

(52) U.S. Cl.
CPC ............... *H02P 27/08* (2013.01); *H02K 3/28* (2013.01); *H02K 11/33* (2016.01)

(58) Field of Classification Search
CPC .......... H02P 27/00; H02P 27/04; H02P 27/06; H02P 27/08; H02P 7/29; H02P 21/00; H02P 21/14; H02P 21/30; H02P 23/07; H02P 23/14; H02P 25/022; H02P 25/03; H02P 25/062; H02P 25/064; H02P 25/10; H02P 25/107; H02P 29/032; H02P 29/50; H02P 2207/076; H02P 2209/09; H02P 1/24; H02P 1/26; H02P 1/42; H02P 6/00; H02P 6/08; H02P 6/32; H02P 21/22; H02P 21/50; H02P 25/22; H02P 25/18; H02M 7/5395; H02M 1/123; H02M 1/0054; H02M 7/53876; B60L 2210/30; B60L 55/00; B60L 2210/44; B60L 2210/40

See application file for complete search history.

(56) References Cited

U.S. PATENT DOCUMENTS

2009/0033253 A1  2/2009 Nagashima et al.
2021/0146792 A1* 5/2021 Lehn ........................ B60L 58/22

FOREIGN PATENT DOCUMENTS

JP          6285256 B2    2/2018

* cited by examiner

Primary Examiner — Antony M Paul
(74) Attorney, Agent, or Firm — Morgan, Lewis & Bockius LLP

(57) ABSTRACT

A motor driving apparatus which drives a motor having a plurality of windings corresponding to a plurality of phases includes: a first inverter having a plurality of first switching elements and connected to a first end of each winding; a second inverter having a plurality of second switching elements and connected to a second end of each winding; and a controller configured to control pulse width modulation, by distributing a preset voltage command of the motor into a voltage command of the first inverter and a voltage command of the second inverter at the same rate and by generating duties of the first switching elements, wherein the controller determines the duties of the second switching elements and determines the duties of the first switching elements on and the duties of the first switching elements.

11 Claims, 12 Drawing Sheets

FIG. 3 -RELATED ART-
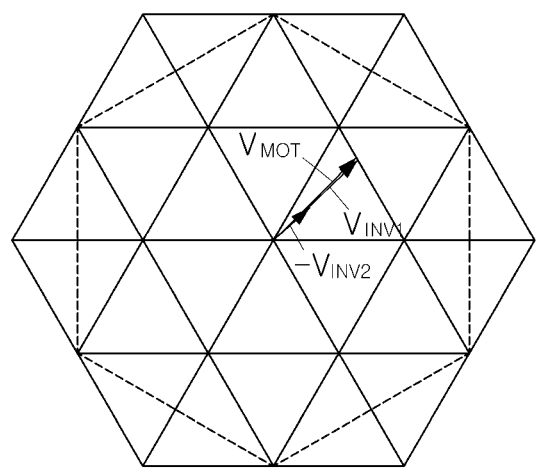
[Synthesized voltage vector]
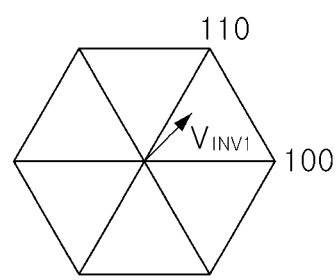
[First inverter voltage vector]
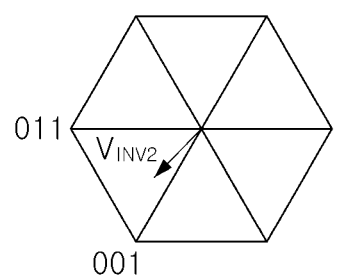
[Second inverter voltage vector]

FIG. 4 -RELATED ART-
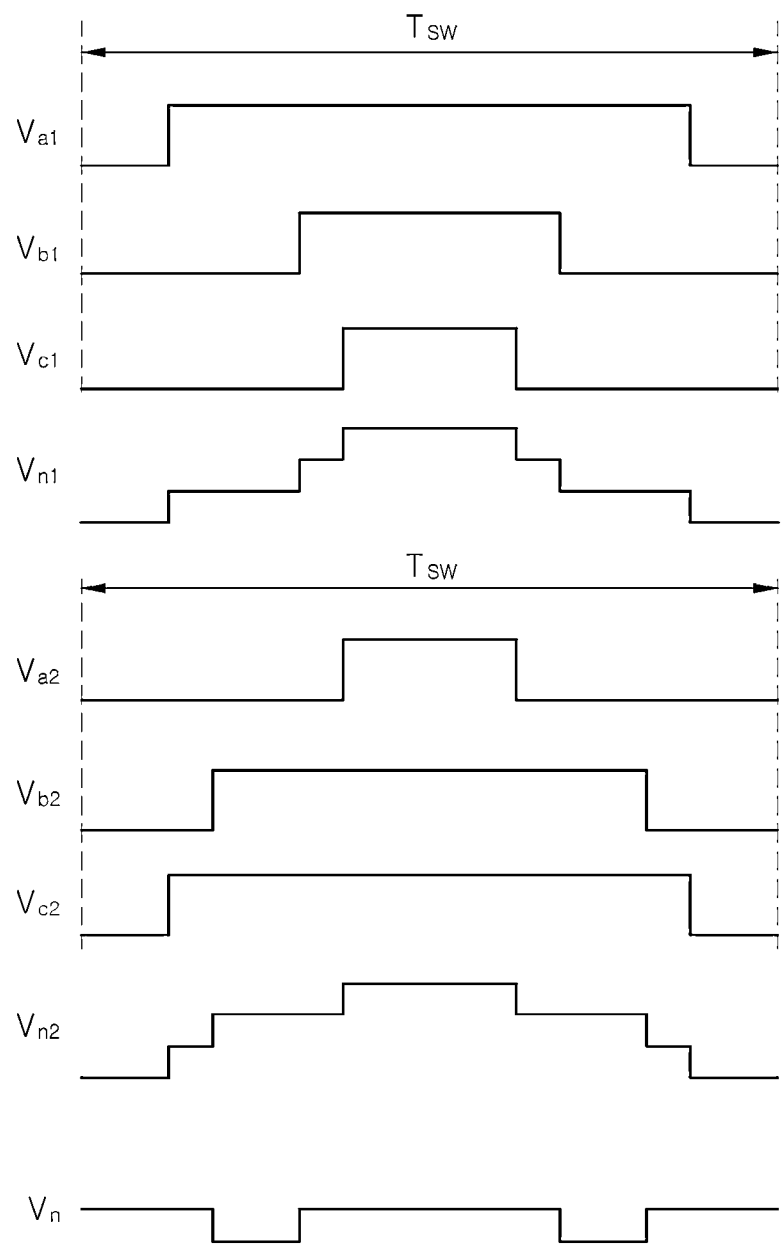

FIG. 10
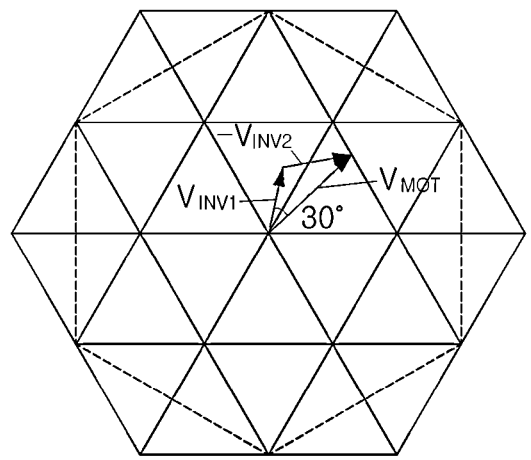
[Synthesized voltage vector]
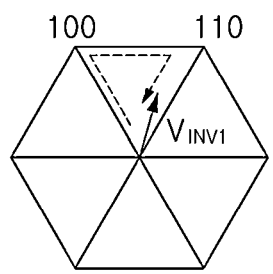
[First inverter voltage vector]
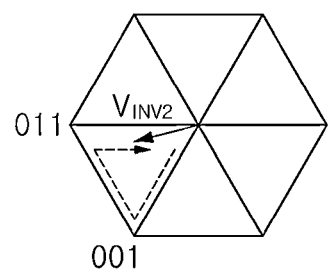
[Second inverter voltage vector]

MOTOR DRIVING APPARATUS

CROSS REFERENCE TO RELATED APPLICATION

The present application claims the benefit of priority to Korean Patent Application No. 10-2021-0095067, filed on Jul. 20, 2021 in the Korean Intellectual Property Office, the entire contents of which is incorporated herein for all purposes by this reference.

TECHNICAL FIELD

The present disclosure relates generally to a motor driving apparatus. More particularly, the present disclosure relates to a motor driving apparatus using an open end winding method in which inverters are connected to the opposite ends of the winding of a motor, respectively.

BACKGROUND

Generally, the winding of each phase included in a motor has a first end connected to one inverter and a second end connected to each other to form a Y connection.

During the driving of the motor, while a switching element in the inverter is turned on/off by pulse width modulation control, a line voltage is applied to the winding of the motor in which the Y connection is formed to generate an alternating current so as to generate torque.

The fuel efficiency of eco-friendly vehicles such as electric vehicles that use torque generated by this motor as power is determined by the power conversion efficiency of an inverter-motor, so it is important to maximize the power conversion efficiency of the inverter and the efficiency of the motor in order to improve fuel efficiency.

The efficiency of the inverter-motor system is mainly determined by the voltage utilization rate of an inverter, and when the operating point of a vehicle determined by a relationship between a motor speed and torque is formed in a section in which the voltage utilization rate is high, the fuel efficiency of the vehicle may be improved.

However, as the number of the windings of a motor is increased in order to increase the maximum torque of the motor, a section having a high voltage utilization rate becomes farther from a low torque area, which is the main operating point of a vehicle, and thus the fuel efficiency of the vehicle may deteriorate. Additionally, in terms of fuel efficiency, when the main operating point is designed to be included in the section having a high voltage utilization rate, there is a limit to the maximum torque of the motor, which may deteriorate the launch acceleration performance of the vehicle.

To solve these problems, in the related technical field, the motor driving technique of an open end winding (OEW) method is proposed, in which two inverters are driven by connecting the inverters to the opposite ends, respectively, of the winding of the motor instead of short-circuiting an end of the winding of the motor through a Y connection.

Such a motor driving technique using the open end winding method has the advantage that the technique can improve voltage utilization rate and realize high output by increasing a phase voltage compared to the method of driving the conventional motor having a Y-connection structure.

However, in the motor driving technique of the open end winding method, where common direct current power is applied to inverters connected to the opposite ends of the winding of the motor, respectively, it is not possible to control a zero (0) phase component voltage to be zero (0) in an average switching circle of the inverters, which may cause common mode current to be generated. This common mode current causes losses such as copper loss and iron loss while the common mode current flows through the winding of the motor, thereby lowering motor efficiency. In a serious case, the common mode current causes damage by fire to the motor system.

The matters described as the background art above are only for improving the understanding of the background of the present disclosure and should not be accepted as acknowledging that they belong to the prior art known to those of ordinary skill in the art.

SUMMARY

Accordingly, the present disclosure has been made keeping in mind the above problems occurring in the related art, and according to various aspects of the present disclosure, a motor driving apparatus may be proposed such that, during the driving of a motor using an open end winding method in which two inverters are connected to the opposite ends of the winding of the motor, respectively, a circulating current generated by common mode voltage difference between the two inverters is removed by setting the common mode voltages between the two inverters to be identical to each other and controlling a zero (0) phase component voltage as desired, thereby improving the efficiency of the motor.

In order to achieve the above effects, according to one aspect of the present disclosure, a motor driving apparatus configured to drive a motor having a plurality of windings respectively corresponding to a plurality of phases may include: a first inverter having a plurality of first switching elements and connected to a first end of each of the plurality of windings of the motor; a second inverter having a plurality of second switching elements and connected to a second end of each of the plurality of windings of the motor; and a controller configured to control pulse width modulation, by distributing a preset voltage command of the motor into a voltage command of the first inverter and a voltage command of the second inverter at the same rate and by generating duties of the first switching elements and duties of the second switching elements, wherein the controller determines the duties of the second switching elements based on a first offset voltage command generated based on a phase voltage command of the first inverter and determines the duties of the first switching elements based on a second offset voltage command generated based on a phase voltage command of the second inverter. In an exemplary embodiment of the present disclosure, the controller may include: a current command map configured to generate a current command map configured to generate a current command based on preset power required for the motor; a current controller configured to generate a voltage command of the motor by comparing the generated current command and a value to detect a current supplied to the motor to reduce a difference between the current command and the value; a first duty generator configured to generate a voltage command of the first inverter by multiplying the voltage command of the motor by ½ times, and to convert the voltage command of the first inverter into a phase voltage command of the first inverter, and to generate the first offset voltage command based on the phase voltage command of the first inverter; and a second duty generator configured to generate a voltage command of the second inverter by multiplying the voltage command of the motor by −½ times, and to convert the voltage command of the second inverter into a phase voltage command of the second inverter, and to generate the second offset voltage command based on the phase voltage command of the second inverter.

In an exemplary embodiment of the present disclosure, the first duty generator may generate a duty for performing pulse width modulation of the first switching elements based on a zero (0) phase component voltage command, the first offset voltage command, and the second offset voltage command of voltage commands of the first inverter, and the second duty generator may generate a duty for performing pulse width modulation of the second pulse width modulation of the second switching elements based on a zero (0) phase component voltage command, the first offset voltage command, and the second offset voltage command of voltage commands of the second inverter.

In an exemplary embodiment of the present disclosure, the first duty generator may supply the first offset voltage command to the second duty generator, and the second duty generator may supply the second inverter phase voltage command to the first duty generator.

In an exemplary embodiment of the present disclosure, the first offset voltage command may be determined as an average of a maximum value and a minimum value of the phase voltage command of the first inverter.

In an exemplary embodiment of the present disclosure, the second offset voltage command may be determined by an average between a maximum value and a minimum value of the phase voltage command of the second inverter.

In an exemplary embodiment of the present disclosure, the first duty generator may generate a first combined offset voltage command by combining the first offset voltage command and the second offset voltage command, and the second duty generator may generate a second combined offset voltage command same as the first combined offset voltage command of the first duty generator by combining the first offset voltage command and the second offset voltage command.

In an exemplary embodiment of the present disclosure, each of the first and second combined offset voltage commands may be an average of the first offset voltage command and the second offset voltage command.

In an exemplary embodiment of the present disclosure, each of the first and second combined offset voltage commands may be a value obtained by applying weighted values to the first offset voltage command and the second offset voltage command, respectively, and then summing the first and second offset voltage commands after application of the weighted values.

In an exemplary embodiment of the present disclosure, the first duty generator may generate a pole voltage command of the first inverter by subtracting from three phase voltage commands of the first inverter a value obtained by subtracting the zero (0) phase component voltage command of the voltage command of the first inverter from the first combined offset voltage command.

In an exemplary embodiment of the present disclosure, the second duty generator may generate a pole voltage command of the second inverter by subtracting from three phase voltage commands of the second inverter a value obtained by subtracting the zero (0) phase component voltage command of the voltage command of the second inverter from the second combined offset voltage command.

According to the motor driving apparatus, zero (0) phase component voltages of two inverters applied in an open end winding method is controlled as desired, thereby suppressing the generation of common mode current.

Accordingly, the distortion of a motor phase current due to the common mode current is prevented, thereby facilitating the control of the motor current, and losses such as the iron and copper losses of the motor caused by the circulating current are prevented, thereby significantly improving the driving efficiency of the motor, and damage by fire to the motors is also prevented in advance.

Effects obtainable in the present disclosure are not limited to the above-mentioned effects, and other effects not mentioned will be clearly understood by those skilled in the art from the following description.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 3 is a voltage vector diagram to describe a motor controlling technique applied in the conventional controller illustrated in FIG. 2;

FIG. 4 is a waveform diagram illustrating a voltage output of each inventor generated during the controlling of the motor by using the conventional controller illustrated in FIG. 2;

FIG. 10 is a voltage vector diagram to describe examples to convert a phase voltage command of a first inverter so that the phase of the motor precedes by 30 degrees a rotation angle of the motor and to convert a phase voltage command of a second inverter so that the phase of the motor precedes by 150 degrees the rotation angle of the motor in the embodiment of the present disclosure illustrated in FIG. 9;

DETAILED DESCRIPTION

Hereinafter, a motor driving apparatus according to various embodiments of the present disclosure will be described in detail with reference to the accompanying drawings.

Figure 1:
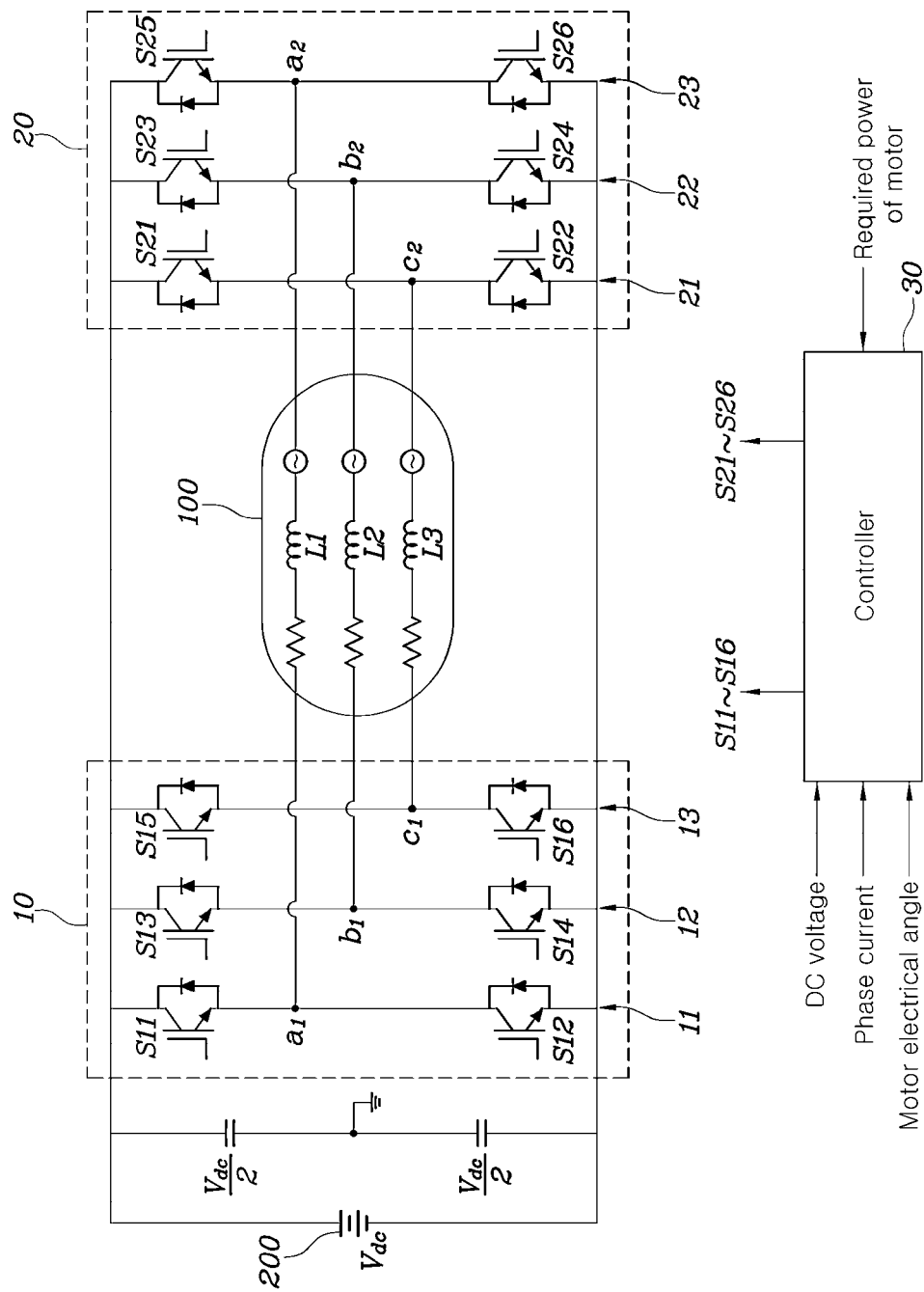
FIG. 1 is a circuit diagram of a motor driving apparatus according to an exemplary embodiment of the present disclosure.

FIG. 1 is a circuit diagram of the motor driving apparatus according to an exemplary embodiment of the present disclosure.

Referring to FIG. 1, the motor driving apparatus according to an exemplary embodiment of the present disclosure is a motor driving apparatus configured to supply driving power to a motor 100 having a plurality of windings L1 to L3 corresponding to a plurality of phases, respectively, and may include a first inverter 10 including a plurality of first switching elements S11 to S16 and connected to the first end of each of the windings of the motor 100, a second inverter 20 including a plurality of second switching elements S21 to S26 and connected to the second end of each of the windings of the motor 100, and a controller 30 performing the pulse width modulation control of the first switching elements S11 to S16 and the second switching elements S21 to S26 based on power required for the motor 100.

The first inverter 10 and the second inverter 20 may convert DC power stored in a battery 200 into three-phase AC power to provide the three-phase AC power to the motor 100, or may convert regenerative braking energy generated by regenerative braking torque of the motor 100 occurring during regenerative braking into DC power to provide the DC power to the battery 200. This conversion between DC power and AC power can be performed by the pulse width modulation control of the plurality of first switching elements S11-S16 and the plurality of second switching elements S21 to S26 provided in the first inverter 10 and the second inverter 20, respectively.

The first inverter 10 may include a plurality of legs 11 to 13 to which a DC voltage formed in a DC capacitor 300 connected between the opposite ends of the battery 200 is applied. The legs 11 to 13 correspond to the plurality of phases of the motor 100, respectively, to perform electrical connection therebetween.

More specifically, a first leg 11 includes two switching elements S11 and S12 connected in series to each other between the opposite ends of the DC capacitor 300, and the connection node of the two switching elements S11 and S12 may be connected to the first end of the winding L1 of one phase in the motor 100 such that AC power corresponding to the one phase of the plurality of phases is input/output.

Likewise, a second leg 12 includes two switching elements S13 and S14 connected in series to each other between the opposite ends of the DC capacitor 300, and the connection node of the two switching elements S13 and S14 may be connected to the first end of the winding L2 of one phase in the motor 100 such that AC power corresponding to the one phase of the plurality of phases is input/output.

In addition, a third leg 13 includes two switching elements S15 and S16 connected in series to each other between the opposite ends of the DC capacitor 300, and the connection node of the two switching elements S15 and S16 may be connected to the first end of the winding L3 of one phase in the motor 100 such that AC power corresponding to the one phase of the plurality of phases is input/output.

The second inverter 20 may also have a configuration similar to the configuration of the first inverter 10. The second inverter 20 may include a plurality of legs 21 to 23 to which the DC voltage formed in the DC capacitor 300 connected between the opposite ends of the battery 200 is applied. The legs 21 to 23 correspond to the plurality of phases of the motor 100, respectively, to perform electrical connection therebetween.

More specifically, a first leg 21 includes two switching elements S21 and S22 connected in series to each other between the opposite ends of the DC capacitor 300, and the connection node of the two switching elements S21 and S22 may be connected to the second end of the winding L3 of one phase in the motor 100 such that AC power corresponding to the one phase of the plurality of phases is input/output.

Likewise, a second leg 22 includes two switching elements S23 and S24 connected in series to each other between the opposite ends of the DC capacitor 300, and the connection node of the two switching elements S23 and S24 may be connected to the second end of the winding L2 of one phase in the motor 100 such that AC power corresponding to the one phase of a plurality of phases is input/output.

In addition, a third leg 23 includes two switching elements S25 and S26 connected in series to each other between the opposite ends of the DC capacitor 300, and the connection node of the two switching elements S25 and S26 may be connected to the second end of the winding L1 of one phase in the motor 100 such that AC power corresponding to the one phase of the plurality of phases is input/output.

The first inverter 10 is connected to the first end of each of the windings L1 to L3 of the motor 100, and the second inverter 20 is connected to the second end of each of the windings L1 to L3 of the motor 100. That is, electrical connection between the inverters and the motor may be performed in an open end winding method in which the opposite ends of each of the windings L1 to L3 of the motor 100 are connected to the first inverter 10 and the second inverter 20, respectively.

The controller 30 is a component configured to perform the pulse width modulation control of the switching elements S11 to S16 and S21 to S26 included in the first inverter 10 and the second inverter 20, respectively, based on power required for the motor 100 such that the motor 100 can be driven.

The controller 30 receives the DC voltage $V_{dc}$ applied to the first inverter 10 and the second inverter 20, a phase current detected by a current sensor (not shown) and supplied to the motor 100, and the electric angle of the motor detected by a motor rotor sensor (not shown) mounted to the motor 100 so as to switch the first switching elements S11 to S16 of the first inverter 10 and the second switching elements S21 to S26 of the second inverter 20 in a pulse width modulation method such that the motor 100 can be driven. Particularly, when controlling the first switching elements S11 to S16 of the first inverter 10 and the second switching elements S21 to S26 of the second inverter 20 in the pulse width modulation method, the controller 30 may apply a space vector pulse width modulation (SVPWM) method.

A controlling technique of a motor driving apparatus employing a conventional open and winding method will be described below, for better clear understanding of the motor driving apparatus configured as described above according to an exemplary embodiment of the present disclosure.

Figure 2:
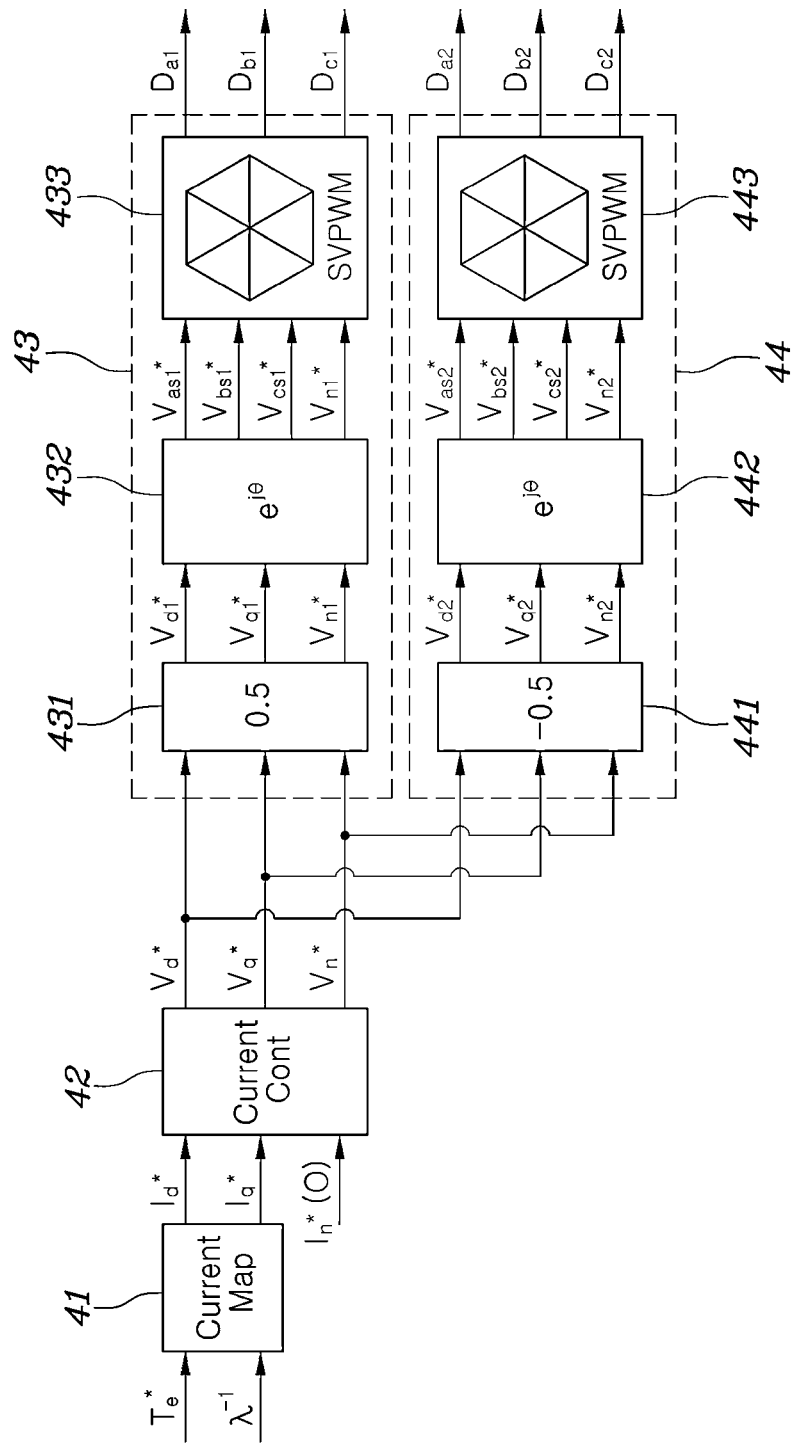
FIG. 2 is a block diagram illustrating in detail a conventional controller to control a motor using an open end winding method.
Figure 5:
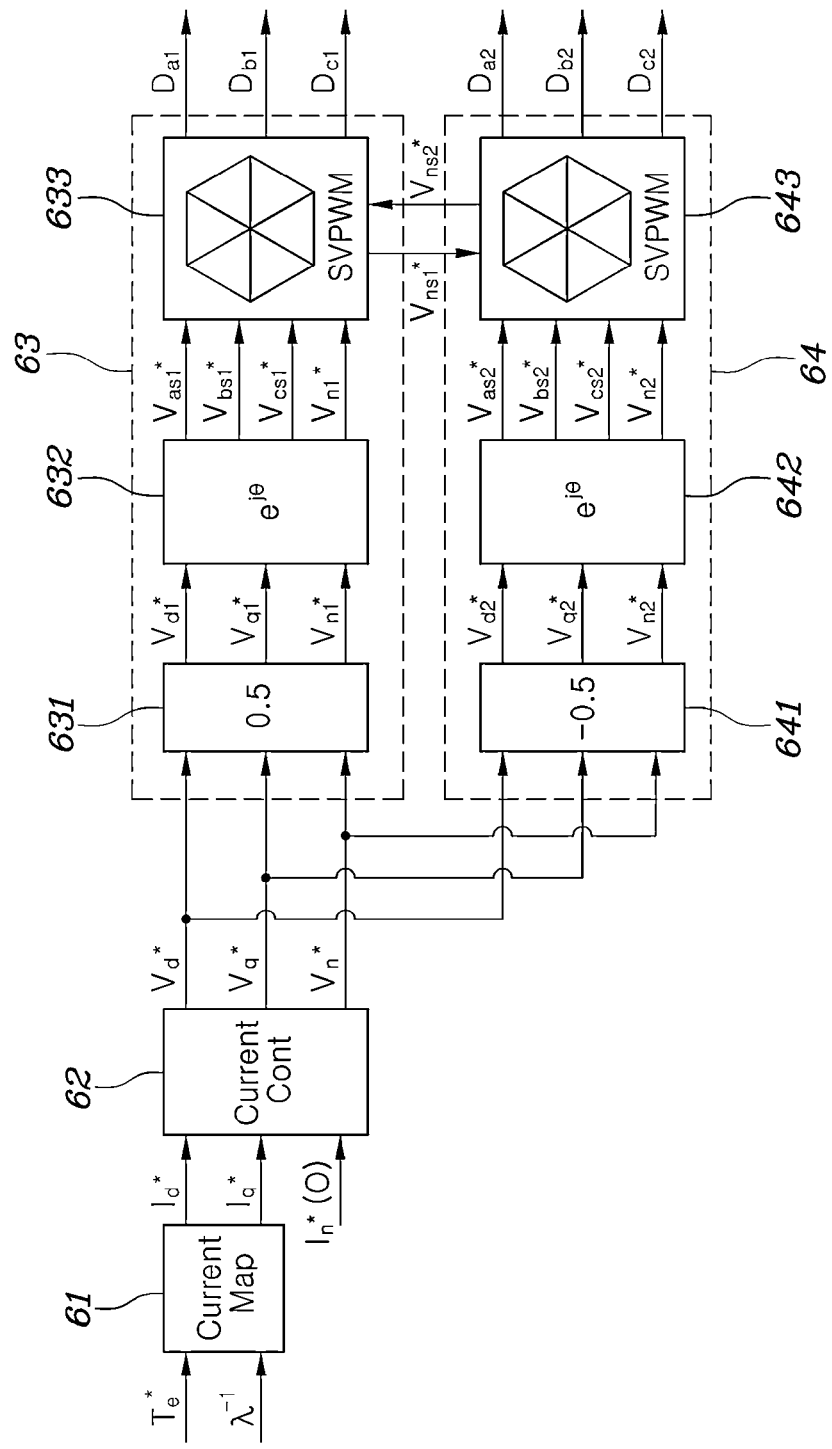
FIG. 5 is a block diagram illustrating in more detail a space vector modulator in the conventional controller illustrated in FIG. 2.

FIG. 2 is a block diagram illustrating in detail a conventional controller to control a motor by using an open end winding method, and FIG. 3 is a vector diagram to describe a motor controlling technique applied in the conventional controller illustrated in FIG. 2. In addition, FIG. 4 is a waveform diagram illustrating a voltage output of each inventor generated during the controlling of the motor by using the conventional controller illustrated in FIG. 2, and FIG. 5 is a block diagram illustrating in more detail a space vector modulator in the conventional controller illustrated in FIG. 2.

As illustrated in FIG. 2, a controller of a conventional motor driving apparatus may include a current command map 41, a current controller 42, a first duty generator 43, and a second duty generator 44.

The current command map 41 may generate power required for a motor (current commands $I_d^*$ and $I_q^*$ corresponding to torque $T_e^*$ required for a motor and counter electromotive force $\lambda^{-1}$ of the power required for the motor), which is generated according to a driver's operation, etc. The current command map 41 is to generate the current commands of a motor reflecting power required for the motor. A map configured to generate current commands of a motor based on the power required for the motor and the counter electromotive force of the motor is illustrated in FIG. 2 as an example, but another map configured to generate current commands of a motor based on other factors may be applied.

The current controller 42 may receive the current commands $I_d^*$ and $I_q^*$, compare them with a value to detect a current supplied to an actual motor, and generate voltage commands $V_d^*$, $V_q^*$, and $V_n^*$ which can reduce the difference. The voltage commands may include a d-axial component $V_d^*$, a q-axial component $V_q^*$, and a zero (0) phase component $V_n^*$.

The first duty generator 43 is an element to generate duties of the switching elements in the first inverter 10 illustrated in FIG. 1 and may include a multiplier 431 multiplying voltage commands $V_d^*$, $V_q^*$, and $V_n^*$ by ½ times to generate first inverter voltage commands $V_{d1}^*$, $V_{q1}^*$, and $V_{n1}^*$ to be applied to the first inverter 10, a coordinate converter 432 converting the first inverter voltage commands $V_{d1}^*$, $V_{q1}^*$, and $V_{n1}^*$ into first inverter phase voltage commands $V_{as1}^*$, $V_{bs1}^*$, and $V_{cs1}^*$ corresponding to the respective phases of the motor, and a first space vector pulse width modulator 433 performing space vector pulse width modulation based on a zero (0) phase component $V_{n1}^*$ of the first inverter voltage commands to generate duties of the switching elements in the first inverter 10.

Similar to the first duty generator 43, the second duty generator 44 is an element to generate duties of the switching elements in the second inverter 20 illustrated in FIG. 1 and may include a multiplier 441 multiplying voltage commands $V_d^*$, $V_q^*$, and $V_n^*$ by −½ times to generate second inverter voltage commands $V_{d2}^*$, $V_{q2}^*$, and $V_{n2}^*$ to be applied to the second inverter 20, a coordinate converter 442 converting the second inverter voltage commands $V_{d2}^*$, $V_{q2}^*$, and $V_{n2}^*$ into second inverter phase voltage commands $V_{as2}^*$, $V_{bs2}^*$, and $V_{cs2}^*$ corresponding to the respective phases of the motor, and a second space vector pulse width modulator 443 performing space vector pulse width modulation based on a zero (0) phase component $V_{n2}^*$ of the second inverter voltage commands to generate duties of the switching elements in the second inverter 20.

Here, coordinate conversion by the coordinate converters 432 and 442 makes a dq coordinate converted into an abc coordinate corresponding to the three phases of the motor, constituting an art known in the related technical field.

As illustrated in FIG. 2, the motor controlling technique using a conventional open end winding method is performed by equally distributing voltage commands of the motor to a first inverter and a second inverter.

That is, as illustrated in FIG. 3, in controlling the motor of an open and winding structure, a motor voltage $V_{MOT}$ present on a combined vector diagram of a switching vector diagram of the first inverter and a switching vector diagram of the second inverter may be represented as a difference between a voltage $V_{INV1}$ by the first inverter and a voltage $V_{INV2}$ by the second inverter, which are same in size but opposite to each other in direction. Each of the vector diagrams is represented on the dq plane. As vector diagrams and the like for the dq plane and the space vector pulse width modulation have been already known in the related technical fields, detailed description thereof is omitted herein.

When the first inverter voltage and the second inverter voltage same in size but opposite to each other in direction as described above are embodied through the space vector pulse width modulation, inverter output voltage waveforms as illustrated in FIG. 4 may be obtained. In FIG. 4, $T_{SW}$ denotes a switching circle of the switching elements in the inverters, $V_{a1}$, $V_{b1}$, $V_{c1}$, and $V_{n1}$ denote the respective phase voltages and the zero (0) phase component voltage of the first inverter, $V_{a2}$, $V_{b2}$, $V_{c2}$, and $V_{n2}$ denote the respective phase voltages and the zero (0) phase component voltage of the second inverter, and $V_n$ denotes a difference between the zero (0) phase component voltage of the first inverter and the zero (0) phase component voltage of the second inverter, which represents zero (0) phase component voltages applied by the first inverter and the second inverter to the motor.

As illustrated in FIG. 4, as the first inverter voltage and the second inverter voltage are different in phase although they are same in voltage size on the dq plane, the first inverter voltage and the second inverter voltage have different zero (0) phase component voltages. Accordingly, the sizes of the zero (0) phase component voltages $V_n$ applied to the motor cannot be maintained at zero (0) on average.

The space vector modulator 433 or 443 in the conventional controller as illustrated in FIG. 2 may include an offset voltage generator 51, a pole voltage command generator 52, a pole voltage command limiter 53, a divider 54, and a summer 55.

The offset voltage generator 51 generates offset voltage commands $V_{ns}^*$ based on the three voltage phases $V_{as}^*$, $V_{bs}^*$, and $V_{cs}^*$, and the pole voltage command generator 52 generates pole voltage commands $V_{an}^*$, $V_{bn}^*$, $V_{cn}^*$ by subtracting from the three phase voltage commands $V_{as}^*$, $V_{bs}^*$, $V_{cs}^*$ a value obtained by subtracting the zero (0) phase voltage $V_n^*$ from the offset voltage command $V_{ns}^*$.

Upon controlling the motor using the conventional open end winding method as described above, the offset voltage command $V_{ns}^*$ is generated based on the three phase voltage commands $V_{as}^*$, $V_{bs}^*$, $V_{cs}^*$. Accordingly, when a motor is actually driven by two inverters, there is a difference between the offset voltages generated by the respective inverters. In particular, the first inverter and the second inverter generate different offset voltage commands $V_{ns}^*$, so that offset voltages corresponding to the offset voltage commands are not generated in each inverter.

This feature can be represented below in Expression 1.

[Expression 1]

$$V_{ns1} = V_{n1}^* - V_{ns1}^* = 0.5 V_n^* - V_{ns1}^*$$

$$V_{ns2} = V_{n2}^* - V_{ns2}^* = -0.5 V_n^* - V_{ns2}^*$$

Accordingly, as the zero (0) phase component voltage finally applied to the motor is represented below in Expression 2, the zero (0) component cannot be generated as desired.

[Expression 2]

$$V_{ns1} - V_{ns2} = V_n{}^* - V_{ns1}{}^* + V_{ns2}{}^*.$$

As described above, where the zero (0) phase component voltage is not controlled to be zero (0) in an average circle, a common mode current of the motor is generated, causing loss occurring in the motor to be increased due to flow of the common mode current. In a serious case, damage by fire to the motor may occur.

In FIG. 5, the pole voltage comment limiter 53 may limit the pole voltage command to ±0.5 of the range of DC voltages $V_{DC}$ applied to the first inverter and the second inverter, the divider 54 may divide the limited pole voltage command by DC voltages $V_{DC}$ applied to the first inverter and the second inverter, and the summer 55 may sum 0.5 to the respective results of the divider 54, so as to determine duties $D_a$, $D_b$, $D_c$ of the switching elements in the inverters.

The pole voltage command limiter 53, the divider 54, and the summer 55 constitute known arts applied to perform the pulse width modulation control, and detailed operations thereof can be sufficiently practiced by those skilled in the art. Accordingly, detailed descriptions thereof are herein omitted.

Figure 6:
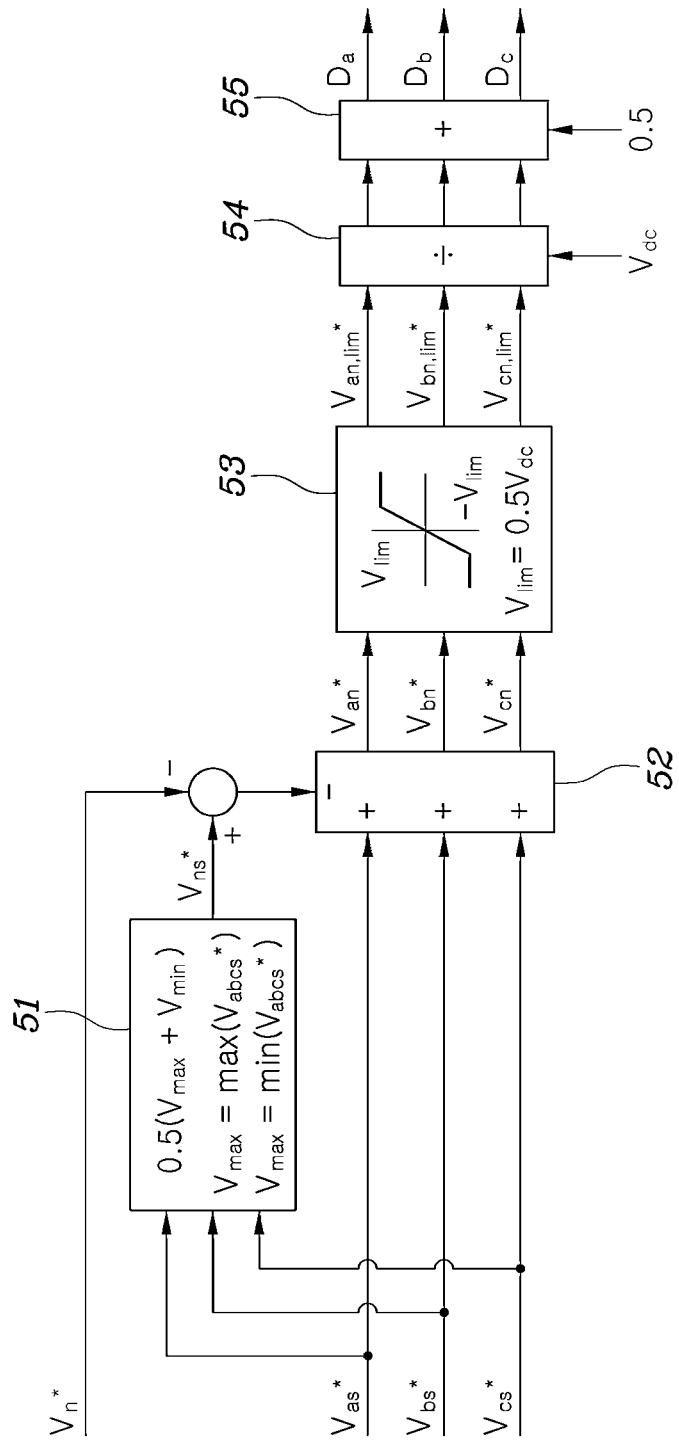
FIG. 6 is a block diagram illustrating in detail a controller applied in a motor driving apparatus according to an exemplary embodiment of the present disclosure.

FIG. 6 is a block diagram illustrating in detail a controller applied in a motor driving apparatus according to an exemplary embodiment of the present disclosure.

Referring to FIG. 6, the controller 30 applied to the motor driving apparatus according to an exemplary embodiment of the present disclosure may include a current command map 61, a current controller 62, a first duty generator 63, and a second duty generator 64.

The current command map 61 may generate power required for a motor (current commands $I_d{}^*$ and $I_q{}^*$ corresponding to torque $T_e{}^*$ required for a motor and counter electromotive force $\lambda^{-1}$ of the power required for the motor), which is generated according to a driver's operation, etc.

The current controller 62 may receive the current commands $I_d{}^*$ and $I_q{}^*$, compare them with a value to detect a current supplied to an actual motor, and generate voltage commands $V_d{}^*$, $V_q{}^*$, and $V_n{}^*$ which can reduce the difference. The voltage commands may include a d-axial component $V_d{}^*$, a q-axial component $V_q{}^*$, and a zero (0) phase component $V_n{}^*$.

The current command map 61 and the current controller 62 may be substantially identical to those applied to the conventional motor controlling technique illustrated in FIG. 2.

The first duty generator 63 is an element to generate duties of the switching elements in the first inverter 10 and may include a multiplier 631 multiplying the voltage commands $V_d{}^*$, $V_q{}^*$, and $V_n{}^*$ by ½ times to generate the first inverter voltage commands $V_{d1}{}^*$, $V_{q1}{}^*$, and $V_{n1}{}^*$ to be applied to the first inverter 10, a coordinate converter 632 converting the first inverter voltage commands $V_{a1}{}^*$, $V_{q1}{}^*$, and $V_{n1}{}^*$ into first inverter phase voltage commands $V_{as1}{}^*$, $V_{bs1}{}^*$, and $V_{cs1}{}^*$ corresponding to the respective phases of the motor, and a first space vector pulse width modulator 633 performing space vector pulse width modulation based on the first offset voltage commands $V_{ns1}{}^*$ generated based on the first inverter phase voltage commands $V_{as1}{}^*$, $V_{bs1}{}^*$, $V_{cs1}{}^*$, the zero (0) phase component $V_{n1}{}^*$ of the first inverter voltage commands, and the second offset voltage commands $V_{ns2}{}^*$ generated in the second duty generator (64) so as to generate duties of the switching elements in the first inverter 10.

Similar to the first duty generator 63, the second duty generator 64 is an element to generate duties of the switching elements in the second inverter 20 and may include a multiplier 641 multiplying voltage commands $V_d{}^*$, $V_q{}^*$, and $V_n{}^*$ by −½ times to generate the second inverter voltage commands $V_{d2}{}^*$, $V_{q2}{}^*$, and $V_{n2}{}^*$ to be applied to the second inverter 20, a coordinate converter 642 converting the second inverter voltage commands $V_{d2}{}^*$, $V_{q2}{}^*$, and $V_{n2}{}^*$ into the second inverter phase voltage commands $V_{as2}{}^*$, $V_{bs2}{}^*$, and $V_{vs2}{}^*$ corresponding to the respective phases of the motor, and a second space vector pulse width modulator (643) performing space vector pulse width modulation based on the second offset voltage commands $V_{ns2}{}^*$ generated based on the second inverter phase voltage commands $V_{as2}{}^*$, $V_{bs2}{}^*$, $V_{cs2}{}^*$, the zero (0) phase component $V_{n2}{}^*$ of the second inverter voltage commands, and the first offset voltage commands $V_{ns1}{}^*$ generated in the first duty generator (63) so as to generate duties of the switching elements in the second inverter 20.

In an embodiment of the present disclosure, the first duty generator 63 and the second duty generator 64 are characterized in that they have in common offset voltage comments determined according to the output voltages of the first inverter 10 and the second inverter 20, respectively, thereby allowing the two inverters to have the same zero (0) phase component voltages. That is, the first duty generator 63 to control the first inverter 10 may generate first offset voltage commands $V_{ns1}{}^*$ using the first inverter phase voltage commands $V_{as1}{}^*$, $V_{bs1}{}^*$, $V_{cs1}{}^*$ corresponding to the output voltages of the first inverter 10 and then supply the first offset voltage command $V_{ns1}{}^*$ to the second duty generator 64. The second duty generator 64 to control the second inverter 20 may generate second offset voltage commands $V_{ns2}{}^*$ using the second inverter phase voltage commands $V_{as2}{}^*$, $V_{bs2}{}^*$, $V_{cs2}{}^*$ corresponding to the output voltages of the second inverter 20 and then supply the second offset voltage command $V_{ns2}{}^*$ to the first duty generator 63.

The first duty generator 63 and the second duty generator 64 may combine the first offset voltage command $V_{ns}$ and the second offset voltage command $V_{ns2}$ with each other to generate combined offset voltage commands having the same value, and apply the combined offset voltage commands and the respective zero (0) phase voltage commands $V_{n1}{}^*$ and $V_{n2}{}^*$ of each inverter to the phase voltage command of each inverter to generate a pole voltage command of each inverter.

Figure 7:
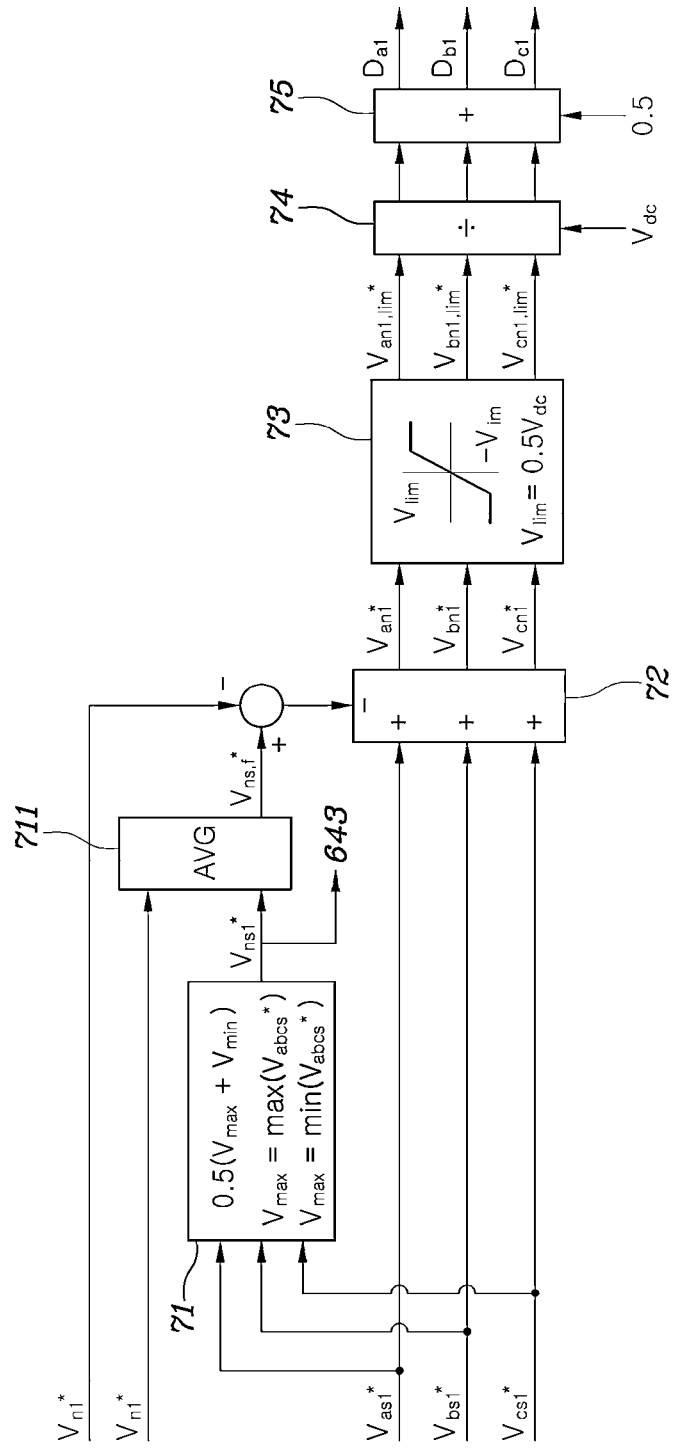
FIG. 7 a block diagram illustrating in more detail a space vector modulator in the controller applied in the motor driving apparatus according to an exemplary embodiment of the present disclosure.

FIG. 7 is a block diagram illustrating in more detail a space vector modulator in the controller applied in the motor driving apparatus according to an exemplary embodiment of the present disclosure. In particular, FIG. 7 illustrates in detail the first space vector pulse width modulator 643 in the first duty generator 63. The second space vector pulse width modulator 644 in the second duty generator 64, which is not illustrated herein, may also be embodied to have a configuration corresponding thereto.

Referring to FIG. 7, the first space vector pulse width modulator 643 in the first duty generator 63 may include an offset voltage generator 71, an offset voltage command combiner 711, a pole voltage command generator 72, a pole voltage command limiter 73, a divider 72, and a summer 75.

The offset voltage generator 71 may generate offset voltage commands $V_{ns1}{}^*$ based on the three phase voltage commands $V_{as1}{}^*$, $V_{bs1}{}^*$, $V_{cs1}{}^*$ of the first inverter 10.

FIG. 7 illustrates that the offset voltage generator 71 operates an offset voltage command $V_{ns1}{}^*$ of the first inverter 10 with an average value of the maximum value and the minimum value of the three phase voltage commands $V_{as1}{}^*$, $V_{bs1}{}^*$, $V_{cs1}{}^*$, simply by way of example. The offset voltage command may be determined using a variety of methods known in the related technical field.

The offset voltage command combiner 711 may combine an offset voltage command $V_{ns1}^*$ of the first inverter 10 generated in the offset voltage generator 71 and an offset voltage command $V_{ns2}^*$ of the second inverter 20 generated by the second space vector pulse width modulator 644 in the second duty generator 64 with each other to generate a combined offset voltage command $V_{ns,f}^*$.

The offset voltage command combiner 711 may generate the combined offset voltage command $V_{ns,f}^*$ in a various manner. For example, the offset voltage command combiner 711 may apply a weighted value to the offset voltage command $V_{ns1}^*$ of the first inverter 10 and the offset voltage command $V_{ns2}^*$ of the second inverter 20 respectively and sums them to generate a combined offset voltage command $V_{ns,f}^*$. In addition, the offset voltage command combiner 711 may determine the combined offset voltage command $V_{ns,f}^*$ as an average value of the offset voltage command $V_{ns1}^*$ of the first inverter 10 and the offset voltage command of the second inverter 20.

In any manner the offset voltage command combiner 711 generates the combined offset voltage command $V_{ns,f}^*$, the combined offset voltage commands $V_{ns,f}^*$ generated in the first space vector pulse width modulator 634 and the second space vector pulse width modulator 644 should be embodied to have the same value between them.

When an average value of the offset voltage commands $V_{ns1}^*$ of the first inverter 10 and the offset voltage command $V_{ns2}^*$ of the second inverter 20 is determined as a combined offset voltage command, the zero (0) phase component voltage output from each inventor is represented below in Expression 3.

[Expression 3]

$$V_{ns1} = V_{n1}^* - V_{ns,f}^* = 0.5 V_n^* - 0.5^*(V_{ns1}^* + V_{ns2}^*)$$

$$V_{ns2} = V_{n2}^* - V_{ns,f}^* = 0.5 V_n^* - 0.5^*(V_{ns1}^* + V_{ns2}^*)$$

According to Expression 3, a difference $V_{ns1} - V_{ns2}$ between the zero (0) phase component voltages of the two inverters may be output as a zero (0) phase component voltage command $V_n^*$ set in the current controller 62. Here, where the combined offset voltage command $V_{ns,f}^*$ finally applied to modulation of the two inverters is determined as an average of the two offset voltage commands $V_{ns1}^*$, $V_{ns2}^*$, the output duties that the two inverters have are same in margin. In this regard, it is desirable that the combined offset voltage command $V_{ns,f}^*$ is determined as an average of the two offset voltage commands $V_{ns1}^*$ and $V_{ns2}^*$.

In FIG. 7, the pole voltage command generator 72 may generate pole voltage commands $V_{an1}^*$, $V_{bn1}^*$ and $V_{cn1}^*$ of the first inverter 10 by subtracting from the respective three phase voltage commands $V_{as1}^*$, $V_{bs1}^*$, $V_{cs1}^*$ of the first inverter 10 a value obtained by subtracting the zero (0) phase component voltage command $V_{n1}^*$ of the voltage commands of the first inverter 10 from the combined offset voltage command $V_{ns,f}^*$.

In FIG. 7, the pole voltage command limiter 73 may limit the pole voltage command to ±0.5 of the range of the DC voltage $V_{DC}$ applied to the first inverter 10 and the second inverter 20, the divider 74 may divide the limited pole voltage command by the DC voltages $V_{DC}$ applied to the first inverter 10 and the second inverter 20, and the summer 75 may determine duties $D_a$, $D_b$, $D_c$ of the switching elements in the inverters by adding 0.5 to the respective results by the divider 75.

The pole voltage command limiter 73, the divider 74, and the summer 75 constitute known arts applied to perform the pulse width modulation control, and detailed operations thereof can be sufficiently practiced by those skilled in the art. Accordingly, detailed descriptions thereof are herein omitted.

In addition, FIG. 7 illustrates a detailed configuration of the space vector pulse width modulator 633 in the first duty generator 63. In this regard, those skilled in the art could easily deduce a detailed configuration of the space vector pulse width modulator 643 in the second duty generator 64. Accordingly, separate description of the space vector pulse width modulator 643 in the second duty generator 64 is omitted herein.

Figure 8:
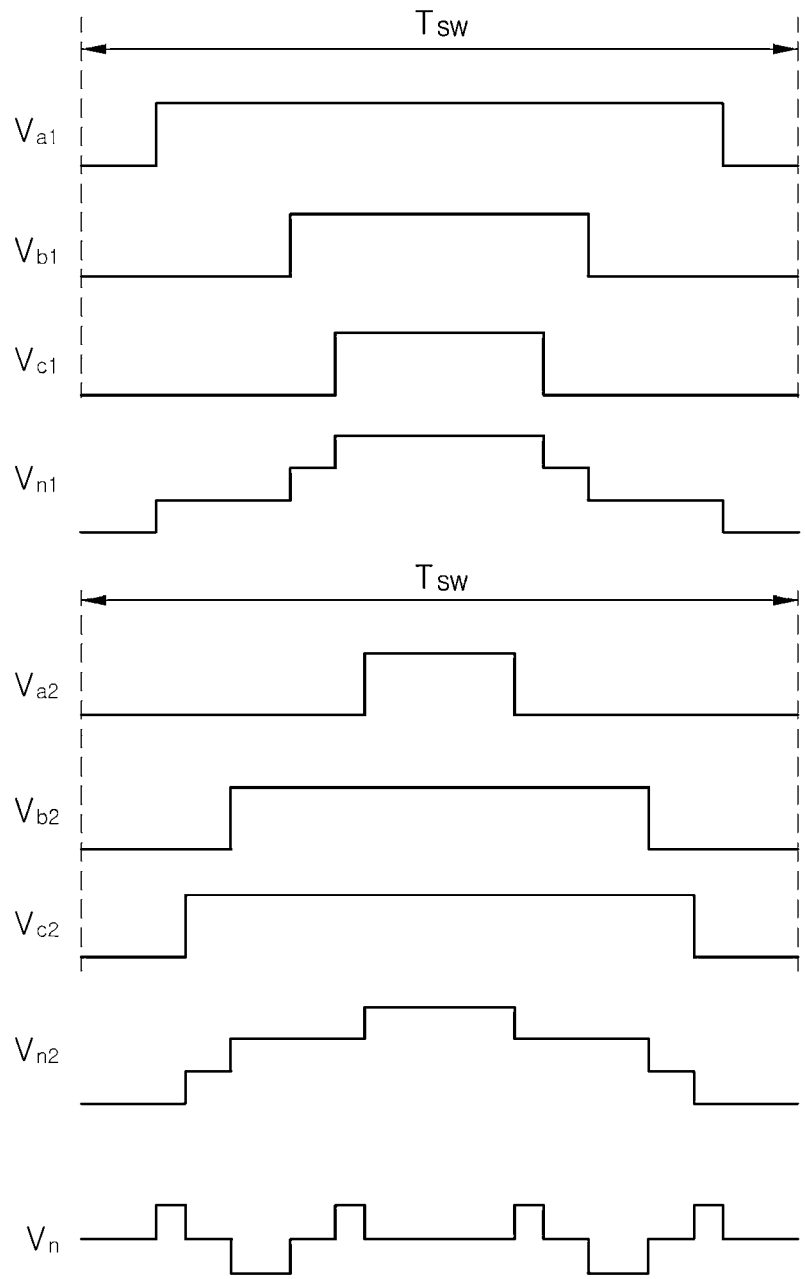
FIG. 8 is a waveform diagram illustrating a voltage output of each inverter generated by controlling the motor driving apparatus according to an exemplary embodiment of the present disclosure.

FIG. 8 is a waveform diagram illustrating a voltage output of each inverter generated by controlling the motor driving apparatus according to an exemplary embodiment of the present disclosure.

Referring to FIG. 8, it can be determined that the zero (0) phase component voltage $V_n$ of the motor is determined to have an average value of zero (0) in one cycle according to the motor driving apparatus according to an embodiment of the present disclosure, compared with the waveform of the conventional motor driving apparatus illustrated in FIG. 4.

The motor driving apparatus according to an embodiment of the present disclosure can perform control of the motor as desired, so that distortion of the zero (0) phase component voltage is not generated due to the space vector pulse width modulation, according to which the common mode current generated by the motor is suppressed, thereby being capable of suppressing unnecessary loss of the motor and preventing damage by fire of the motor.

As described above, the embodiment of the present disclosure illustrated in FIGS. 6 to 8 is to control an average of the zero (0) phase component voltages in the switching circle to be zero (0). This embodiment enables the zero (0) phase component voltage to be zero (0) in an average circle. However, as the zero (0) phase component voltages are instantaneously pulsated, a common mode current may be generated and the instantaneous common mode current may also generate loss of the motor. Another embodiment of the present disclosure to remove the instantaneous common mode current by suppressing pulsation of the zero (0) phase component voltage is described below.

Figure 9:
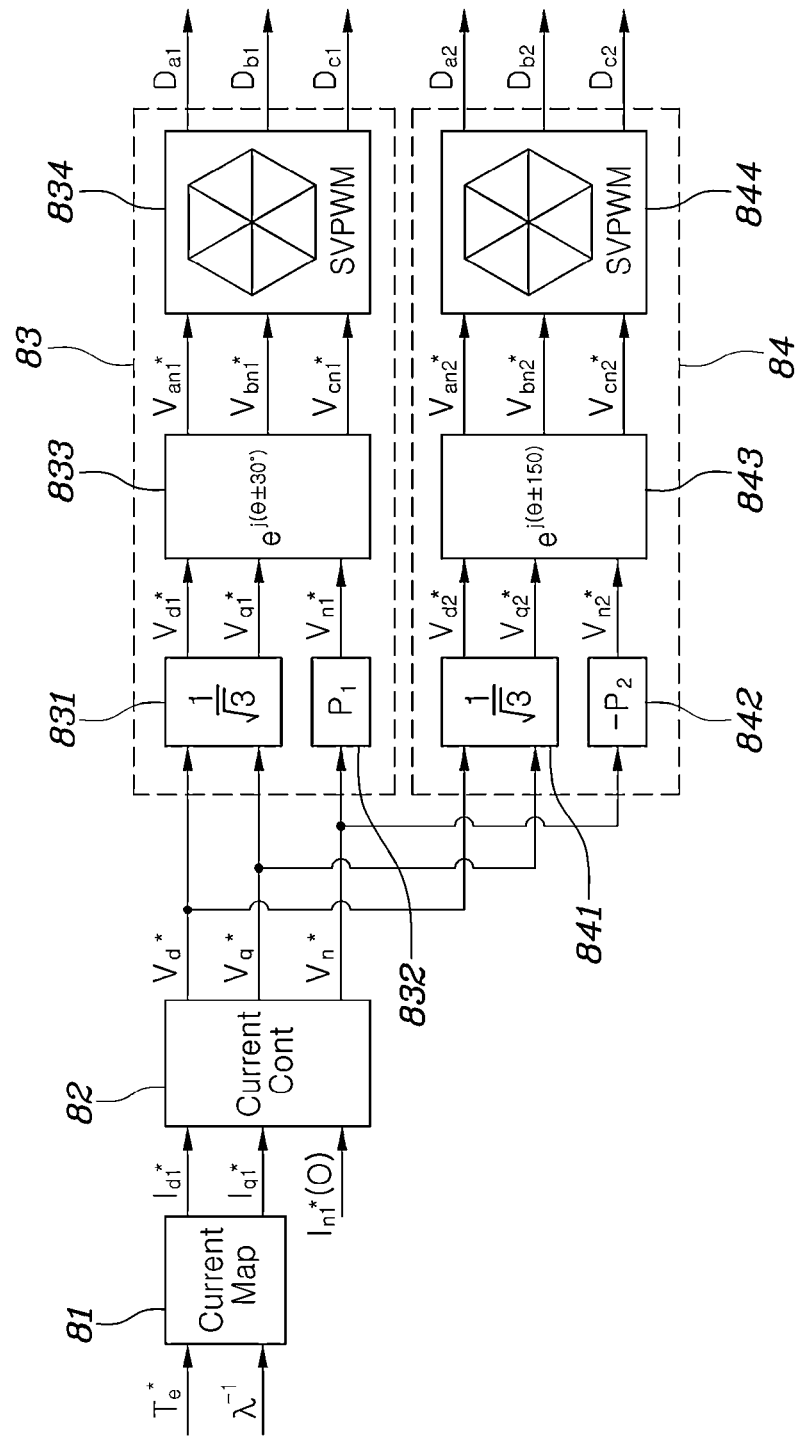
FIG. 9 is a block diagram illustrating in detail a controller applied in a motor driving apparatus according to another exemplary embodiment of the present disclosure.

FIG. 9 is a block diagram illustrating in detail a controller applied in a motor driving apparatus according to another exemplary embodiment of the present disclosure.

Referring to FIG. 9, the controller 30 of the motor driving apparatus according to another exemplary embodiment of the present disclosure may include a current command map 81, a current controller 82, a first duty generator 83, and a second duty generator 84.

The current command map 81 may generate power required for a motor (current commands $I_d^*$ and $I_q^*$ corresponding to torque $T_e^*$ required for a motor and counter electromotive force $\lambda^{-1}$ of the power required for the motor), which is generated according to a driver's operation, etc.

The current controller 82 receives the current commands $I_d^*$ and $I_q^*$, compares them with a value to detect a current supplied to an actual motor, and generates voltage commands $V_d^*$, $V_q^*$, and $V_n^*$ which can reduce the difference. The voltage commands may include a d-axial component $V_d^*$, a q-axial component $V_q^*$, and a zero (0) phase component $V_n^*$.

The current command map 81 and the current controller 82 may be substantially identical to those applied to the conventional motor controlling technique illustrated in FIG. 2.

The first duty generator 83 is an element to generate duties of the switching elements in the first inverter 10 and may include a first multiplier 831 multiplying the d-axial voltage command $V_d^*$ and the q-axial voltage command $V_q^*$ of the voltage commands $V_d^*$, $V_q^*$, and $V_n^*$ by $1/\sqrt{3}$ times to generate a first inverter d-axial voltage command $V_{d1*}$ and a first inverter q-axial command $V_{q1}^*$ to be applied to the first inverter 10, a second multiplier 831 multiplying the zero (0) phase component voltage command of the voltage commands $V_d^*$, $V_q^*$, $V_n^*$ by $P_1$ times to generate a first inverter zero (0) phase component voltage command $V_{n1}^*$, a coordinate converter 833 converting the first inverter voltage commands $V_{d1}^*$, $V_{q1}^*$, and $V_{n1}^*$ into the first inverter phase voltage commands $V_{as1}^*$, $V_{bs1}^*$, and $V_{cs1}^*$ corresponding to the respective phases of the motor whereby the phases of the motor precede or follow by 30 degrees relative to a rotation angle θ of the motor, and a first space vector pulse width modulator 834 performing space vector pulse width modulation based on the first inverter phase voltage commands $V_{as1}^*$, $V_{ns1}^*$ to generate duties $D_{a1}$, $D_{b1}$, $D_{c1}$ of the switching elements in the first inverter 10.

The second duty generator 84 is an element to generate duties of the switching elements in the second inverter 20 and may include a third multiplier 841 multiplying the d-axial voltage command $V_d^*$ and the q-axial voltage command $V_q^*$ of the voltage commands $V_d^*$, $V_q^*$, $V_n^*$ by $1/\sqrt{3}$ times to generate a second inverter d-axial voltage command $V_{d2}^*$ and a first inverter q-axial command $V_{q2}^*$ to be applied to the second inverter 20, a fourth multiplier 842 multiplying the zero (0) phase component voltage command of voltage commands $V_d^*$, $V_q^*$, $V_n^*$ by $-P_2$ (here, $P_1+P_2=1$) times to generate a second inverter zero (0) phase component voltage command $V_{n2}^*$, a coordinate converter 843 converting the second inverter voltage commands $V_{d2}^*$, $V_{q2}^*$, and $V_{n2}^*$ respectively into the second inverter phase voltage commands $V_{as2}^*$, $V_{bs2}^*$, and $V_{cs2}^*$ corresponding to the respective phases of the motor whereby the phases of the motor precede or follow by 150 degrees with respect to a rotation angle θ of the motor, and a second space vector pulse width modulator 844 performing space vector pulse width modulation based on the second inverter phase voltage commands $V_{as2}^*$, $V_{bs2}^*$, $V_{cs2}^*$ to generate duties $D_{a2}$, $D_{b2}$, $D_{c2}$ of the switching elements in the second inverter 20.

In an embodiment of the present disclosure, the first duty generator 83 and the second duty generator 84 are characterized in performing coordinate conversion in such a manner that there is a difference of 120 degrees between them in the course of converting the d-axial voltage command and the q-axial voltage command into three phases voltage commands.

Figure 11:
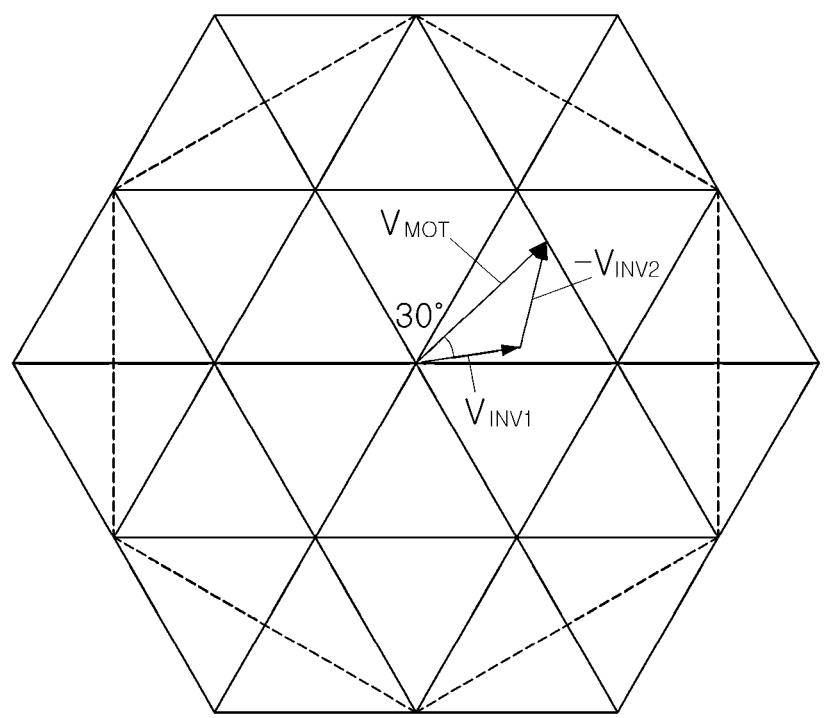
FIG. 11 is a voltage vector diagram to describe examples to convert a phase voltage command of a first inverter so that the phase of the motor follows by 30 degrees a rotation angle of the motor and to convert a phase voltage command of a second inverter so that the phase of the motor follows by 150 degrees the rotation angle of the motor in the embodiment of the present disclosure illustrated in FIG. 9.

FIG. 10 is a voltage vector diagram to describe examples to convert a phase voltage command of a first inverter so that the phase of the motor precedes by 30 degrees a rotation angle of the motor and to convert a phase voltage command of a second inverter so that the phase of the motor precedes by 150 degrees the rotation angle of the motor in the embodiment of the present disclosure illustrated in FIG. 9, and FIG. 11 is a voltage vector diagram to describe examples to convert a phase voltage command of a first inverter so that the phase of the motor follows by 30 degrees a rotation angle of the motor and to convert a phase voltage command of a second inverter so that the phase of the motor follows by 150 degrees the rotation angle of the motor in the embodiment of the present disclosure illustrated in FIG. 9.

As illustrated in FIG. 10, a motor voltage $V_{MOT}$ may be represented as a difference between a first inverter voltage $V_{INV1}$ and a second inverter voltage $V_{INV2}$. More particularly, in a case where the first inverter voltage $V_{INV1}$ precedes by 30 degrees the motor voltage $V_{MOT}$ and has a size of $1/\sqrt{3}$ times of the motor voltage, and the second inverter voltage $V_{INV2}$ precedes by 150 degrees the motor voltage $V_{MOT}$ and has a size of $1/\sqrt{3}$ times of the motor voltage, a difference between the first inverter voltage and the second inverter voltage is represented as a motor voltage.

Similarly, as illustrated in FIG. 11, in a case where the first inverter voltage $V_{INV1}$ follows by 30 the motor voltage $V_{MOT}$ degrees and has a size of $1/\sqrt{3}$ times of the motor voltage, and the second inverter voltage $V_{INV2}$ follows by 150 degrees the motor voltage $V_{MOT}$ and has a size of $1/\sqrt{3}$ times of the motor voltage, a difference between the first inverter voltage and the second inverter voltage is represented as a motor voltage.

Figure 12:
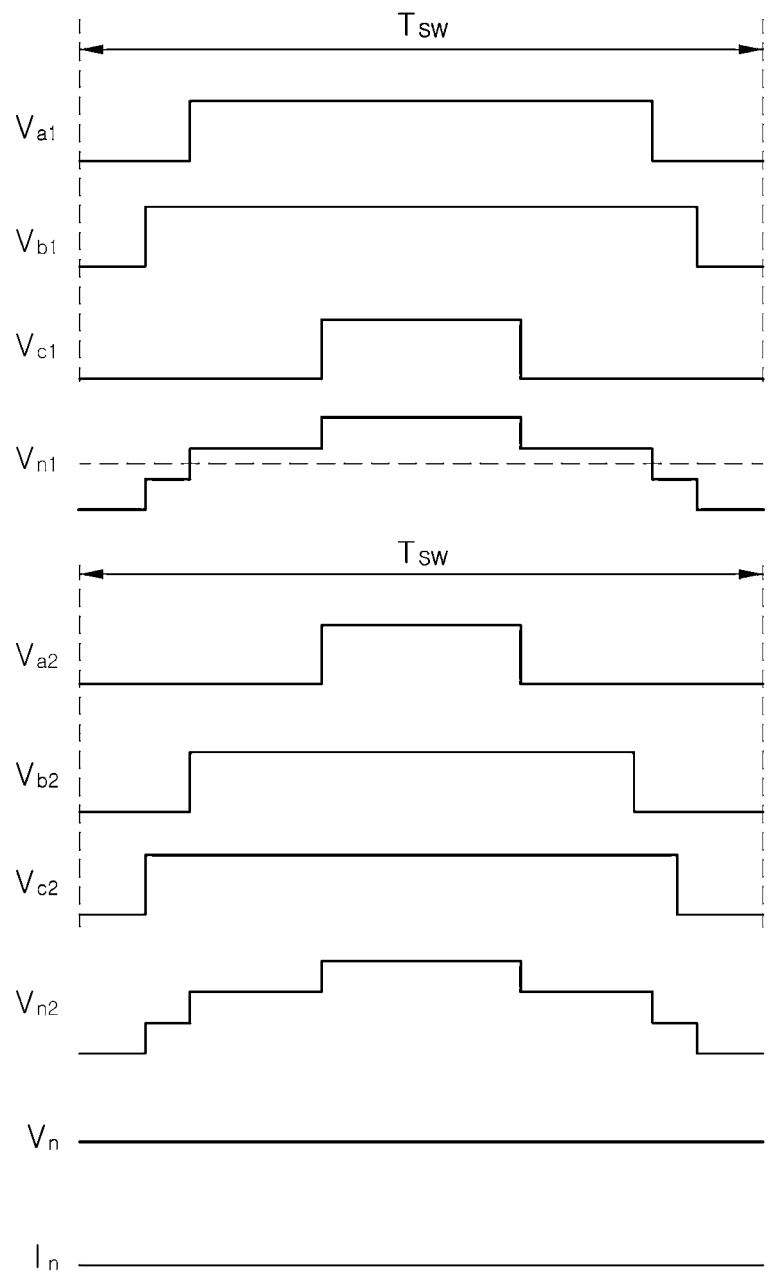
FIG. 12 is a waveform diagram illustrating a voltage output, a zero (0) phase voltage component and a common mode current of each inverter produced by controlling the motor driving apparatus according to the embodiment of the present disclosure illustrated in FIG. 9.

FIG. 12 is a waveform diagram illustrating a voltage output, a zero (0) phase voltage component and a common mode current of each inverter produced by controlling the motor driving apparatus according to the embodiment of the present disclosure illustrated in FIG. 9.

As illustrated in FIG. 12, in a case where two inverters perform modulation using voltage vector, the same zero (0) phase component voltages $V_{n1}$ and $V_{n2}$ are instantaneously represented. Accordingly, a difference between the zero (0) phase component voltages of the two inverters becomes instantaneously zero (0), thus a zero (0) phase component current ripple (common mode current) due to a difference between the zero (0) phase component voltages also becomes zero (0).

In an exemplary embodiment of the present disclosure, the zero (0) phase component voltage commands $V_n^*$ of the respective inverters may be distributed unequally. That is, it may be determined that the multiple value $P_1$ for the first inverter 10 and the multiple value $P_2$ for the second inverter set by the second multiplier 832 and the fourth multiplier 842 are different in size from each other. Here, a sum of the two multiple values in size should be one (1) ($P_1+P_2=1$).

Distribution of the zero (0) phase component voltage commands $V_n^*$ does not impact on output of the motor, posing no difference in terms of the motor.

By way of example, in a case where the zero (0) phase component voltages are distributed equally in size (the sizes of $P_1$ and $P_2$ are same), the final output duties of the two inverters become different because of such an error as switching dead time present in the inverters and compensation therefor. In this regard, a case where one of the inverters first encounters the duty limit may occur.

Meanwhile, if the two inverters are given freedom regarding distribution of the zero (0) phase component voltage commands, a means to equally control maximum values of the duties which vary different because of such an error as dead time present in the inverters can be provided, through which output of the motor may be increased. That is, problems caused by the inevitable errors that the inverters inherently have can be properly improved through tuning of the multiple values $P_1$ and $P_2$, which would result in improving output of the motor.

Although shown and described in relation to specific embodiment of the present disclosure above, it will be apparent to those skilled in the art that the present disclosure may be variously improved and changed within the scope of the claims.

What is claimed is:

1. A motor driving apparatus configured to drive a motor having a plurality of windings respectively corresponding to a plurality of phases, the apparatus comprising:
a first inverter comprising a plurality of first switching elements and connected to a first end of each of the plurality of windings of the motor;
a second inverter comprising a plurality of second switching elements and connected to a second end of each of the plurality of windings of the motor; and
a controller configured to control pulse width modulation, by distributing a preset voltage command of the motor into a voltage command of the first inverter and a voltage command of the second inverter at the same rate and by generating duties of the first switching elements and duties of the second switching elements, wherein the controller determines the duties of the second switching elements based on a first offset voltage command generated based on a phase voltage command of the first inverter and determines the duties of the first switching elements based on a second offset voltage command generated based on a phase voltage command of the second inverter.

2. The apparatus of claim 1, wherein the controller comprises:
a current command map configured to generate a current command based on preset power required for the motor;
a current controller configured to generate a voltage command of the motor by comparing the generated current command and a value to detect a current supplied to the motor to reduce a difference between the current command and the value;
a first duty generator configured to generate a voltage command of the first inverter by multiplying the voltage command of the motor by ½ times, and to convert the voltage command of the first inverter into a phase voltage command of the first inverter, and to generate the first offset voltage command based on the phase voltage command of the first inverter; and
a second duty generator configured to generate a voltage command of the second inverter by multiplying the voltage command of the motor by −½ times, and to convert the voltage command of the second inverter into a phase voltage command of the second inverter, and to generate the second offset voltage command based on the phase voltage command of the second inverter.

3. The apparatus of claim 2, wherein the first duty generator generates a duty for performing pulse width modulation of the first switching elements based on a zero (0) phase component voltage command of the voltage command of the first inverter, the first offset voltage command, and the second offset voltage command, and the second duty generator generates a duty for performing pulse width modulation of the second pulse width modulation of the second switching elements based on a zero (0) phase component voltage command of the voltage command of the second inverter, the first offset voltage command, and the second offset voltage command.

4. The apparatus of claim 3, wherein the first duty generator supplies the first offset voltage command to the second duty generator, and the second duty generator supplies the second inverter phase voltage command to the first duty generator.

5. The apparatus of claim 3, wherein the first offset voltage command is determined as an average of a maximum value and a minimum value of the phase voltage command of the first inverter.

6. The apparatus of claim 3, wherein the second offset voltage command is determined by an average between a maximum value and a minimum value of the phase voltage command of the second inverter.

7. The apparatus of claim 3, wherein the first duty generator generates a first combined offset voltage command by combining the first offset voltage command and the second offset voltage command, and the second duty generator generates a second combined offset voltage command same as the first combined offset voltage command of the first duty generator by combining the first offset voltage command and the second offset voltage command.

8. The apparatus of claim 7, wherein each of the first and second combined offset voltage commands is an average of the first offset voltage command and the second offset voltage command.

9. The apparatus of claim 7, wherein each of the first and second combined offset voltage commands is a value obtained by applying weighted values to the first offset voltage command and the second offset voltage command, respectively, and then summing the first and second offset voltage commands after application of the weighted values.

10. The apparatus of claim 7, wherein the first duty generator generates a pole voltage command of the first inverter by subtracting, from three phase voltage commands of the first inverter, a value obtained by subtracting the zero (0) phase component voltage command of the voltage command of the first inverter from the first combined offset voltage command.

11. The apparatus of claim 7, wherein the second duty generator generates a pole voltage command of the second inverter by subtracting, from three phase voltage commands of the second inverter, a value obtained by subtracting the zero (0) phase component voltage command of the voltage command of the second inverter from the second combined offset voltage command.

* * * * *